US010377868B2

(12) United States Patent
Kumar et al.

(10) Patent No.: US 10,377,868 B2
(45) Date of Patent: Aug. 13, 2019

(54) FILLED POLYURETHANE COMPOSITES WITH ORGANIC AND INORGANIC FIBERS

(71) Applicant: BORAL IP HOLDINGS (AUSTRALIA) PTY LIMITED, North Sydney (AU)

(72) Inventors: Amitabha Kumar, San Antonio, TX (US); Li Ai, San Antonio, TX (US); Sarah Fortenberry, San Antonio, TX (US); Russell L. Hill, San Antonio, TX (US)

(73) Assignee: BORAL IP HOLDINGS (AUSTRALIA) PTY LIMITED, North Sydney (AU)

( * ) Notice: Subject to any disclaimer, the term of this patent is extended or adjusted under 35 U.S.C. 154(b) by 0 days.

(21) Appl. No.: 15/781,220

(22) PCT Filed: Dec. 17, 2015

(86) PCT No.: PCT/US2015/066329
§ 371 (c)(1),
(2) Date: Jun. 4, 2018

(87) PCT Pub. No.: WO2017/105459
PCT Pub. Date: Jun. 22, 2017

(65) Prior Publication Data
US 2018/0319942 A1  Nov. 8, 2018

(51) Int. Cl.
*C08J 5/04* (2006.01)
*C08G 18/50* (2006.01)
*C08G 18/66* (2006.01)
*C08G 18/76* (2006.01)
*C08G 18/08* (2006.01)
*C08G 18/32* (2006.01)
*C08G 18/40* (2006.01)
*C08G 18/42* (2006.01)
*C08L 75/04* (2006.01)
*B32B 27/40* (2006.01)

(52) U.S. Cl.
CPC ............. *C08J 5/046* (2013.01); *B32B 27/40* (2013.01); *C08G 18/0895* (2013.01); *C08G 18/3275* (2013.01); *C08G 18/4018* (2013.01); *C08G 18/4208* (2013.01); *C08G 18/5021* (2013.01); *C08G 18/6622* (2013.01); *C08G 18/7671* (2013.01); *C08J 5/043* (2013.01); *C08L 75/04* (2013.01); *B32B 2419/00* (2013.01); *C08J 2375/04* (2013.01)

(58) Field of Classification Search
CPC ....... C08J 5/046; C08J 5/043; C08G 18/0895; C08G 18/3275; C08G 18/4018; C08G 18/4208; C08G 18/5021; C08G 18/6622; C08L 2375/04

USPC .......................................................... 428/395
See application file for complete search history.

(56) References Cited

U.S. PATENT DOCUMENTS

| 4,683,246 | A | 7/1987 | Davis et al. |
| 4,687,796 | A | 8/1987 | Cordova et al. |
| 5,508,315 | A | 4/1996 | Mushovic |
| 6,258,310 | B1 | 7/2001 | Sardanopoli et al. |
| 7,241,818 | B2 | 7/2007 | Hemmings et al. |
| 7,879,144 | B2 | 2/2011 | Hemmings et al. |
| 8,846,776 | B2 | 9/2014 | Herrington et al. |
| 9,752,015 | B2 * | 9/2017 | Kumar ..................... C08K 3/00 |
| 9,988,512 | B2 * | 6/2018 | Crocco .............. C08G 18/5021 |
| 10,138,341 | B2 * | 11/2018 | Crocco .............. C08G 18/4829 |
| 2005/0266222 | A1 | 12/2005 | Clark et al. |
| 2008/0132611 | A1 | 6/2008 | Brown |
| 2010/0143695 | A1 * | 6/2010 | Ogawa .................. B29C 51/004 428/306.6 |
| 2011/0086934 | A1 | 4/2011 | Herrington et al. |
| 2012/0148803 | A1 | 6/2012 | Schleiermacher et al. |
| 2017/0267585 | A1 * | 9/2017 | Kumar ..................... C04B 14/06 |
| 2018/0218010 | A1 * | 8/2018 | Hill ..................... C08G 18/4829 |
| 2018/0305259 | A1 * | 10/2018 | Kumar ..................... C04B 14/06 |

FOREIGN PATENT DOCUMENTS

| WO | WO 2004/080698 A1 | 9/2004 |
| WO | WO 2005/072485 A2 | 8/2005 |
| WO | WO 2013/000860 A1 | 1/2013 |

OTHER PUBLICATIONS

Araujo, E. M. et al., "Fiberglass wastes/polyester resin composites: Mechanical properties and water sorption," *Polimeros*, vol. 16, pp. 332-335 (2006).
Fibermax Composites, "Types of Fiber Reinforcement," 2002-2018 (2 pages), available at http://www.fibermaxcomposites.com/shop/index_files/typesoffiber.html.
International Search Report for PCT/US2015/066329 dated Sep. 12, 2016 (6 pages).

* cited by examiner

*Primary Examiner* — Hannah J Pak
(74) *Attorney, Agent, or Firm* — Bookoff McAndrews, PLLC

(57) ABSTRACT

Polyurethane composites and methods of preparation are described herein. The polyurethane composites can comprise (a) a polyurethane formed by the reaction of (i) one or more isocyanates selected from the group consisting of diisocyanates, polyisocyanates, and mixtures thereof, and (ii) one or more polyols, (b) an inorganic filler, (c) an inorganic fiber, and (d) an organic fiber. Suitable organic fibers can include polyester fibers. The weight ratio of the inorganic fiber to the organic fiber can be from 1:1 to 20:1. Articles comprising the polyurethane composites described herein are also disclosed.

20 Claims, No Drawings

FILLED POLYURETHANE COMPOSITES WITH ORGANIC AND INORGANIC FIBERS

This application is a U.S. National Stage filing under 35 U.S.C. § 371 of International Patent Application No. PCT/US2015/066329, filed on Dec. 17, 2015.

FIELD OF THE DISCLOSURE

This disclosure relates generally to polyurethane composites, more particularly, to the use of organic and inorganic fibers in polyurethane composites.

BACKGROUND OF THE DISCLOSURE

Polymeric composites that contain organic and/or inorganic filler materials have become desirable for a variety of uses because of their excellent mechanical properties and weathering stability. Foamed versions of these materials can have a relatively low density yet the filler materials can provide a composite material that is extremely strong. The polymer provided in the composite can help provide good toughness (i.e., resistance to brittle fracture) and resistance to degradation from weathering to the composite when it is exposed to the environment. Thus, polymeric composites including organic and/or inorganic fillers can be used in a variety of applications.

The use of polyurethane composites has grown over the last three decades. This can be attributed to their superior tensile strength, impact resistance, and abrasion resistance compared to, for example, unsaturated polyester and vinyl ester-based composites. One of the methods to manufacture high-performance highly-filled polyurethane composite products is to increase the content of reinforcement, such as inorganic fibers, in such products. However, when the reinforcing inorganic fiber content is increased, the viscosity of the starting composite mixture also increases making processing into products more difficult. In addition, when a large amount of reinforcing inorganic fiber is used, more fibers can break and crush during the manufacturing process because of their brittle nature, resulting in a decrease in the reinforcing effect of fibers. Thus, there is a need for alternate reinforcing materials in polyurethane composites. The compositions and methods described herein address these and other needs.

SUMMARY OF THE DISCLOSURE

Polyurethane composites and methods of preparation are described herein. The polyurethane composites can comprise (a) a polyurethane formed by the reaction of (i) one or more isocyanates selected from the group consisting of diisocyanates, polyisocyanates, and mixtures thereof, and (ii) one or more polyols, (b) an inorganic filler, (c) an inorganic fiber, and (d) an organic fiber. In some embodiments, the polyurethane composite comprises 35 to 90% by weight of the inorganic filler, 0.25% to 20% by weight of the inorganic fiber, 0.1% to 20% by weight of the organic fiber, wherein the weight ratio of the inorganic fiber to the organic fiber is from 1:1 to 20:1. In some embodiments, the weight ratio of the inorganic fiber to the organic fiber can be from 1:1 to 10:1 or from 1:1 to 5:1.

The amount of polyurethane in the composite can be from 14% to 60% by weight, e.g., 15% to 45% by weight, based on the total weight of the polyurethane composite. The one or more polyols used to produce the polyurethane composite can include 50% or more of one or more first polyols. In some embodiments, the one of more first polyols can each comprise a hydroxyl number, defined as the hydroxyl number multiplied by the percentage of primary hydroxyl groups based on the total number of hydroxyl groups in the polyol, of greater than 250 mg KOH/g. In some embodiments, the one or more first polyols can comprise 75% or more primary hydroxyl groups based on the total number of hydroxyl groups in the polyol. The one or more polyols in the polyurethane composite can include an aromatic polyester polyol or an aromatic polyether polyol. The inorganic filler in the polyurethane composite can include coal ash such as fly ash. In some embodiments, the inorganic filler can include calcium carbonate, sand, or a mixture thereof. The amount of inorganic filler in the polyurethane composite can be from 35% to 90% by weight, based on the total weight of the polyurethane composite. For example, the inorganic filler can be present in an amount from 35% to 85% or 50% to 80% by weight, based on the total weight of the polyurethane composite.

The polyurethane composite can include an inorganic fiber. The amount of inorganic fiber in the polyurethane composite can be from 0.25% to 20% by weight, based on the total weight of the polyurethane composite. For example, the inorganic fiber can be present in an amount from 0.25% to 15%, 0.5% to 10%, from 1% to 10%, or from 2% to 10% by weight, based on the total weight of the polyurethane composite. Examples of inorganic fibers useful in the composite can include glass fibers, mineral wool fibers, or combinations thereof. In some embodiments, the polyurethane composite comprises a plurality of glass fibers. The glass fibers can have an average length of 1 mm or greater. In some examples, the glass fibers can have an average length of from 1.5 mm to 30 mm.

The polyurethane composite can include an organic fiber. Examples of organic fibers useful in the polyurethane composite can include polyalkylene fibers, polyester fibers, polyamide fibers, phenol-formaldehyde fibers, polyvinyl chloride fibers, polyacrylic fibers, acrylic polyester fibers, polyurethane fibers, polyacrylonitrile fibers, rayon fibers, cellulose fibers, or combinations thereof. In some embodiments, the organic fiber can include polyester fibers. The organic fiber can be coated with an agent selected from surfactants, bonding agents, pigments, coupling agents, and combinations thereof. In some examples, the organic fiber can be coated with an aminosilane, an oil, a starch, or a combination thereof. The amount of organic fiber in the polyurethane composite can be from 0.1% to 20% by weight, based on the total weight of the polyurethane composite. In some embodiments, the organic fiber can be present in an amount from 0.5% to 8% or 0.25% to 4% by weight, based on the total weight of the polyurethane composite. The organic fiber can have an average length of 26 mm or less, for example 50 microns to 26 mm or from 1.5 mm to 10 mm. The organic fiber can have an average diameter of 100 microns or less, for example 3 microns to 100 microns. The organic fiber can have an average aspect ratio of length to diameter of from 1.5:1 to 2000:1 such as from 1.5:1 to 250:1.

The density of the polyurethane composites described herein can be from 10 lb/ft$^3$ to 70 lb/ft$^3$. The flexural strength of the polyurethane composite can be 200 psi or greater, as measured by ASTM C1185-08 (2012). In some examples, the polyurethane composites are foamed.

In some embodiments, the polyurethane composite can comprise (a) from 14% to 40% by weight, based on the total weight of the composite, of a polyurethane formed by the reaction of (i) one or more isocyanates selected from the group consisting of diisocyanates, polyisocyanates, and mixtures thereof, and (ii) one or more polyols, (b) from 35% to 85% by weight, based on the total weight of the composite, of an inorganic filler, (c) from 0.5% to 20% by weight, based on the total weight of the composite, of an inorganic fiber, and (d) a polyester fiber. The polyester fiber can be present in an amount of from 0.5% to 8% or from 0.25% to 4% by weight, based on the total weight of the composite. The weight ratio of the inorganic fiber to polyester fiber can be from 1:1 to 20:1. The polyester fiber can have an average length of 100 microns or less.

Articles comprising the polyurethane composites described herein are also disclosed. In some embodiments, the article can be a building material. The building material can be selected from siding materials, carpet backings, building panels, sheets, architectural moldings, sound barriers, thermal barriers, insulation, and roofing materials.

Methods of making the polyurethane composites are also described. The method can include mixing the (1) one or more isocyanates selected from the group consisting of diisocyanates, polyisocyanates, and mixtures thereof, (2) one or more polyols, (3) inorganic filler, (4) inorganic fiber, and (5) organic fiber to form a mixture. The mixture may further comprise a catalyst. The method can include allowing the one or more isocyanates and the one or more polyols to react in the presence of the inorganic filler, the organic fiber, and the inorganic fiber to form the polyurethane composite. The viscosity of the initial mixture can be from 25 Pa·s to 250 Pa·s.

DETAILED DESCRIPTION

Polyurethane composites and methods of preparing polyurethane composites are described herein. The polyurethane composites can comprise a polyurethane formed using highly reactive systems such as highly reactive polyols, isocyanates, or both.

Isocyanates suitable for use in the polyurethane composites described herein include one or more monomeric or oligomeric poly- or di-isocyanates. The monomeric or oligomeric poly- or di-isocyanate include aromatic diisocyanates and polyisocyanates. The isocyanates can also be blocked isocyanates or pre-polymer isocyanates. An example of a useful diisocyanate is methylene diphenyl diisocyanate (MDI). Useful MDI's include MDI monomers, MDI oligomers, and mixtures thereof.

Further examples of useful isocyanates include those having NCO (i.e., the reactive group of an isocyanate) contents ranging from about 25% to about 35% by weight. Examples of useful isocyanates are found, for example, in *Polyurethane Handbook: Chemistry, Raw Materials, Processing Application, Properties*, 2$^{nd}$ Edition, Ed: Gunter Oertel; Hanser/Gardner Publications, Inc., Cincinnati, Ohio, which is herein incorporated by reference. Suitable examples of aromatic polyisocyanates include 2,4- or 2,6-toluene diisocyanate, including mixtures thereof; p-phenylene diisocyanate; tetramethylene and hexamethylene diisocyanates; 4,4-dicyclohexylmethane diisocyanate; isophorone diisocyanate; 4,4-phenylmethane diisocyanate; polymethylene polyphenylisocyanate; and mixtures thereof. In addition, triisocyanates may be used, for example, 4,4,4-triphenylmethane triisocyanate; 1,2,4-benzene triisocyanate; polymethylene polyphenyl polyisocyanate; methylene polyphenyl polyisocyanates; and mixtures thereof. Suitable blocked isocyanates are formed by the treatment of the isocyanates described herein with a blocking agent (e.g., diethyl malonate, 3,5-dimethylpyrazole, methylethylketoxime, and caprolactam). Isocyanates are commercially available, for example, from Bayer Corporation (Pittsburgh, Pa.) under the trademarks MONDUR and DESMODUR. Other examples of suitable isocyanates include MONDUR MR Light (Bayer Corporation; Pittsburgh, Pa.), PAPI 27 (Dow Chemical Company; Midland, Mich.), Lupranate M20 (BASF Corporation; Florham Park, N.J.), Lupranate M70L (BASF Corporation; Florham Park, N.J.), Rubinate M (Huntsman Polyurethanes; Geismar, La.), Econate 31 (Ecopur Industries), and derivatives thereof.

The average functionality of isocyanates useful with the composites described herein can be between about 1.5 to about 5. Further, examples of useful isocyanates include isocyanates with an average functionality of about 2 to about 4.5, about 2.2 to about 4, about 2.4 to about 3.7, about 2.6 to about 3.4, and about 2.8 to about 3.2.

As indicated herein, the composites include one or more polyols. The one or more polyols for use in the polyurethane composite can include polyester polyols, polyether polyols, or combinations thereof. In some embodiments, the one or more polyols can include 50% or more of one or more highly reactive (i.e., first) polyols. For example, the one or more polyols can include greater than 55%, greater than 60%, greater than 65%, greater than 70%, greater than 75%, greater than 80%, greater than 85%, greater than 90%, greater than 95%, or 100% of one or more highly reactive polyols.

In some embodiments, the one or more highly reactive polyols can include polyols having a hydroxyl number of greater than 250. For example, the hydroxyl number can be greater than 275, greater than 300, greater than 325, greater than 350, greater than 375, greater than 400, greater than 425, greater than 450, greater than 475, greater than 500, greater than 525, greater than 550, greater than 575, greater than 600, greater than 625, greater than 650, greater than 675, greater than 700, greater than 725, or greater than 750.

In some embodiments, the one or more highly reactive polyols can include polyols having a primary hydroxyl number of greater than 250. As used herein, the primary hydroxyl number is defined as the hydroxyl number multiplied by the percentage of primary hydroxyl groups based on the total number of hydroxyl groups in the polyol. For example, the primary hydroxyl number can be greater than 255, greater than 260, greater than 265, greater than 270, greater than 275, greater than 280, greater than 285, greater than 290, or greater than 295.

In some embodiments, the one or more highly reactive polyols include a large number of primary hydroxyl groups (e.g. 75% or more) based on the total number of hydroxyl groups in the polyol. For example, the highly reactive polyols can include 80% or more, 85% or more, 90% or more, 95% or more, or 100% of primary hydroxyl groups. The number of primary hydroxyl groups can be determined using fluorine NMR spectroscopy as described in ASTM D4273, which is hereby incorporated by reference in its entirety.

In some embodiments, the one or more highly reactive polyols can include a Mannich polyol. Mannich polyols are the condensation product of a substituted or unsubstituted phenol, an alkanolamine, and formaldehyde. Mannich polyols can be prepared using methods known in the art. For example, Mannich polyols can be prepared by premixing the phenolic compound with a desired amount of the alkanolamine, and then slowly adding formaldehyde to the mixture at a temperature below the temperature of Novolak formation. At the end of the reaction, water is stripped from the reaction mixture to provide a Mannich base. See, for example, U.S. Pat. No. 4,883,826, which is incorporated herein by reference in its entirety. The Mannich base can then be alkoxylated to provide a Mannich polyol.

The substituted or unsubstituted phenol can include one or more phenolic hydroxyl groups. In certain embodiments, the substituted or unsubstituted phenol includes a single hydroxyl group bound to a carbon in an aromatic ring. The phenol can be substituted with substituents which do not undesirably react under the conditions of the Mannich condensation reaction, a subsequent alkoxylation reaction (if performed), or the preparation of polyurethanes from the final product. Examples of suitable substituents include alkyl (e.g., a $C_1$-$C_{18}$ alkyl, or a $C_1$-$C_{12}$ alkyl), aryl, alkoxy, phenoxy, halogen, and nitro groups.

Examples of suitable substituted or unsubstituted phenols that can be used to form Mannich polyols include phenol, o-, p-, or m-cresols, ethylphenol, nonylphenol, dodecylphenol, p-phenylphenol, various bisphenols including 2,2-bis(4-hydroxyphenyl)propane (bisphenol A), β-naphthol, β-hydroxyanthracene, p-chlorophenol, o-bromophenol, 2,6-dichlorophenol, p-nitrophenol, 4- or 2-nitro-6-phenylphenol, 2-nitro-6- or 4-methylphenol, 3,5-dimethylphenol, p-isopropylphenol, 2-bromo-6-cyclohexylphenol, and combinations thereof. In some embodiments, the Mannich polyol is derived from phenol or a monoalkyl phenols (e.g., a para-alkyl phenols). In some embodiments, the Mannich polyol is derived from a substituted or unsubstituted phenol selected from the group consisting of phenol, para-n-nonylphenol, and combinations thereof.

The alkanolamine used to produce the Mannich polyol can include a monoalkanolamine, a dialkanolamine, a trialkanolamine, a tetraalkanolamine, or combinations thereof. Examples of suitable monoalkanolamines include methylethanolamine, ethylethanolamine, methylisopropanolamine, ethylisopropanolamine, methyl-2-hydroxybutylamine, phenylethanolamine, ethanolamine, isopropanolamine, and combinations thereof. Exemplary dialkanolamines include diisopropanolamine, ethanolisopropanolamine, ethanol-2-hydroxybutylamine, isopropanol-2-hydroxybutylamine, isopropanol-2-hydroxyhexylamine, ethanol-2-hydroxyhexylamine, and combinations thereof. Exemplary trialkanolamines include three hydroxy-substituted $C_1$-$C_{12}$ alkyl groups (e.g., three hydroxy-substituted $C_1$-$C_8$ alkyl groups, or three hydroxy-substituted $C_1$-$C_6$ alkyl groups). Examples of suitable trialkanolamines include triisopropanolamine, triethanolamine, tris(2-hydroxybutyl)amine, hydroxyethyl di(hydroxypropyl)amine, hydroxypropyl di(hydroxyethyl)amine, tri(hydroxypropyl)amine, or combinations thereof. Exemplary tetraalkanolamines include four hydroxy-substituted $C_1$-$C_{12}$ alkyl groups (e.g., four hydroxy-substituted $C_1$-$C_8$ alkyl groups, or four hydroxy-substituted $C_1$-$C_6$ alkyl groups). In certain embodiments, the alkanolamine is selected from the group consisting of diethanolamine, diisopropanolamine, and combinations thereof.

Any suitable alkylene oxide or combination of alkylene oxides can be used to form the Mannich polyol. In some embodiments, the alkylene oxide is selected from the group consisting of ethylene oxide, propylene oxide, butylene oxide, and combinations thereof. In certain embodiments, the Mannich polyol is alkoxylated with from 100% to about 80% propylene oxide and from 0 to about 20 wt % ethylene oxide.

Mannich polyols are known in the art, and include, for example, ethylene and propylene oxide-capped Mannich polyols sold under the trade names CARPOL® MX-425 and CARPOL® MX-470 (Carpenter Co., Richmond, Va.).

In some embodiments, the one or more first polyols can include an aromatic polyester polyol, an aromatic polyether polyol, or a combination thereof. In some embodiments, the one or more first polyols include an aromatic polyester polyol such as those sold under the TEROL® trademark (e.g., TEROL® 198).

Examples of highly reactive polyols also include Pel-Soy 744 and Pel-Soy P-750, soybean oil based polyols commercially available from Pelron Corporation; Agrol Diamond, a soybean oil based polyol commercially available from BioBased Technologies; Ecopol 122, Ecopol 131 and Ecopol 132, soybean oil polyols formed using polyethylene terephthalate and commercially available from Ecopur Industries; Stepanpol PD-110 LV and PS 2352, polyols based on soybean oil, diethylene glycol and phthallic anhydride and commercially available from Stepan Company; Voranol 280, 360 and WR2000, polyether polyols commercially available from Dow Chemical Company; Honey Bee HB-530, a soybean oil-based polyol commercially available from MCPU Polymer Engineering; Renewpol, commercially available from Styrotech Industries (Brooklyn Park, Minn.); JeffAdd B 650, a 65% bio-based content (using ASTM D6866-06) additive based on soybean oil commercially available from Huntsman Polyurethanes; Jeffol SG 360, a sucrose and glycerin-based polyol commercially available from Huntsman Polyurethanes; and derivatives thereof. For example, Ecopol 131 is a highly reactive aromatic polyester polyol comprising 80% primary hydroxyl groups, a hydroxyl number of 360-380 mg KOH/g, i.e., and a primary hydroxyl number of 288-304 mg KOH/g.

The one or more polyols for use in the polyurethane composites can include one or more plant-based polyols. In some embodiments, the plant-based polyols are highly reactive polyols. The one or more plant-based polyols useful in the polyurethane composites can include polyols containing ester groups that are derived from plant-based fats and oils. Accordingly, the one or more plant-based polyols can contain structural elements of fatty acids and fatty alcohols. Starting materials for the plant-based polyols of the polyurethane component can include fats and/or oils of plant-based origin with preferably unsaturated fatty acid residues. The one or more plant-based polyols useful with the polyurethane composites include, for example, castor oil, coconut oil, corn oil, cottonseed oil, lesquerella oil, linseed oil, olive oil, palm oil, palm kernel oil, peanut oil, sunflower oil, tall oil, and mixtures thereof. In some embodiments, the one or more polyols do not include plant-based polyols.

In some embodiments, the one or more polyols include a less reactive polyol. For example, the polyurethane composite can be produced from one or more less reactive polyols in addition to one or more highly reactive polyols. Less reactive polyols can have lower hydroxyl numbers, lower numbers of primary hydroxyl groups and/or lower primary hydroxyl numbers than the highly reactive polyols. In some embodiments, the less reactive polyols can have hydroxyl numbers of less than 250, less than 225, less than 200, less than 175, less than 150, less than 125, less than 100, less than 80, less than 60, less than 40, or even less than 20. In some embodiments, the less reactive polyols have about 50% or less primary hydroxyl groups, about 40% or less primary hydroxyl groups, about 30% or less primary hydroxyl groups, about 20% or less primary hydroxyl groups, or even about 10% or less primary hydroxyl groups. In some embodiments, the less reactive polyols can have primary hydroxyl numbers of less than about 220, less than about 200, less than about 180, less than about 160, less than about 140, less than about 120, less than about 100, less than about 80, less than about 60, less than about 40, or even less than about 20. Suitable less reactive polyols include castor oil; Stepanpol PS-2052A (commercially available from the Stepan Company); Agrol 2.0, 3.6, 4.3, 5.6 and 7.0 (plant-based polyols commercially available from BioBased Technologies); Ecopol 123 and Ecopol 124, which are commercially available from Ecopur Industries; Honey Bee HB-150 and HB-230, soybean oil-based polyols commercially available from MCPU Polymer Engineering; Terol 1154, commercially available from Oxid (Houston, Tex.); Multranol 3900, Multranol 3901, Arcol 11-34, Arcol 24-32, Arcol 31-28, Arcol E-351, Arcol LHT-42, and Arcol LHT-112, commercially available from Bayer; and Voranol 220-028, 220-094, 220-110N, 222-056, 232-027, 232-034, and 232-035, commercially available from Dow.

The one or more polyol can include 50% or less of one or more less reactive polyols in addition to the one or more highly reactive polyols. For example, the one or more polyol can include less than 45%, less than 40%, less than 35%, less than 30%, less than 25%, less than 20%, less than 15%, less than 10%, or less than 5%, of one or more less reactive polyols.

The one or more polyol for use in the disclosure can have an average functionality of 1.5 to 8.0, 1.6 to 6.0, 1.8 to 4.0, 2.5 to 3.5, or 2.6 to 3.1. The average hydroxyl number values (as measured in units of mg KOH/g) for the one or more polyol can be from about 100 to 600, 150 to 550, 200 to 500, 250 to 440, 300 to 415, and 340 to 400.

The polyurethane composites can include more than one type of polyol. The one or more polyols can be combined in various percentages, e.g., 15-40% of a less reactive polyol and 60-85% of a highly reactive polyol.

The polyurethane systems used to form the composite materials described herein can include one or more additional isocyanate-reactive monomers in addition to the one or more polyol. The one or more additional isocyanate-reactive monomers can include, for example, amine and optionally hydroxyl groups.

In some embodiments, the one or more additional isocyanate-reactive monomers can include a polyamine. The first isocyanate-reactive monomer can comprise a polyamine. Any suitable polyamine can be used. Suitable polyamines can correspond to the polyols described herein (for example, a polyester polyol or a polyether polyol), with the exception that the terminal hydroxy groups are converted to amino groups, for example by amination or by reacting the hydroxy groups with a diisocyanate and subsequently hydrolyzing the terminal isocyanate group to an amino group. By way of example, the polyamine can be polyether polyamine, such as polyoxyalkylene diamine or polyoxyalkylene triamine. Polyether polyamines are known in the art, and can be prepared by methods including those described in U.S. Pat. No. 3,236,895 to Lee and Winfrey. Exemplary polyoxyalkylene diamines are commercially available, for example, from Huntsman Corporation under the trade names Jeffamine® D-230, Jeffamine® D-400 and Jeffamine® D-2000. Exemplary polyoxyalkylene triamines are commercially available, for example, from Huntsman Corporation under the trade names Jeffamine® T-403, Jeffamine® T-3000, and Jeffamine® T-5000.

In some embodiments, the additional isocyanate-reactive monomer can include an alkanolamine. The alkanolamine can be a dialkanolamine, a trialkanolamine, a tetraalkanolamine, or a combination thereof. Suitable dialkanolamines include dialkanolamines which include two hydroxy-substituted $C_1$-$C_{12}$ alkyl groups (e.g., two hydroxy-substituted $C_1$-$C_8$ alkyl groups, or two hydroxy-substituted $C_1$-$C_6$ alkyl groups). The two hydroxy-substituted alkyl groups can be branched or linear, and can be of identical or different chemical composition. Examples of suitable dialkanolamines include diethanolamine, diisopropanolamine, ethanolisopropanolamine, ethanol-2-hydroxybutylamine, isopropanol-2-hydroxybutylamine, isopropanol-2-hydroxyhexylamine, ethanol-2-hydroxyhexylamine, and combinations thereof. Suitable trialkanolamines include trialkanolamines which include three hydroxy-substituted $C_1$-$C_{12}$ alkyl groups (e.g., three hydroxy-substituted $C_1$-$C_8$ alkyl groups, or three hydroxy-substituted $C_1$-$C_6$ alkyl groups). The three hydroxy-substituted alkyl groups can be branched or linear, and can be of identical or different chemical composition. Examples of suitable trialkanolamines include triisopropanolamine (TIPA), triethanolamine, N,N-bis(2-hydroxyethyl)-N-(2-hydroxypropyl)amine (DEIPA), N,N-bis (2-hydroxypropyl)-N-(hydroxyethyl)amine (EDIPA), tris(2-hydroxybutyl)amine, hydroxyethyl di(hydroxypropyl) amine, hydroxypropyl di(hydroxyethyl)amine, tri (hydroxypropyl)amine, hydroxyethyl di(hydroxy-n-butyl) amine, hydroxybutyl di(hydroxypropyl)amine, and combinations thereof.

In some embodiments, the additional isocyanate-reactive monomer can comprise an adduct of an alkanolamine described above with an alkylene oxide. The resulting amine-containing polyols can be referred to as alkylene oxide-capped alkanolamines. Alkylene oxide-capped alkanolamines can be formed by reacting a suitable alkanolamine with a desired number of moles of an alkylene oxide. Any suitable alkylene oxide or combination of alkylene oxides can be used to cap the alkanolamine. In some embodiments, the alkylene oxide is selected from the group consisting of ethylene oxide, propylene oxide, butylene oxide, and combinations thereof. Alkylene oxide-capped alkanolamines are known in the art, and include, for example, propylene oxide-capped triethanolamine sold under the trade names CARPOL® TEAP-265 and CARPOL® TEAP-335 (Carpenter Co., Richmond, Va.).

In some embodiments, the additional isocyanate-reactive monomer can include an alkoxylated polyamine (i.e., alkylene oxide-capped polyamines) derived from a polyamine and an alkylene oxide. Alkoxylated polyamine can be formed by reacting a suitable polyamine with a desired number of moles of an alkylene oxide. Suitable polyamines include monomeric, oligomeric, and polymeric polyamines. In some cases, the polyamines has a molecular weight of less than 1000 g/mol (e.g., less than 800 g/mol, less than 750 g/mol, less than 500 g/mol, less than 250 g/mol, or less than 200 less than 200 g/mol). Examples of suitable polyamines that can be used to form alkoxylated polyamines include ethylenediamine, 1,3-diaminopropane, putrescine, cadaverine, hexamethylenediamine, 1,2-diaminopropane, o-phenylenediamine, m-phenylenediamine, p-phenylenediamine, spermidine, spermine, norspermidine, toluene diamine, 1,2-propane-diamine, diethylenetriamine, triethylenetetramine, tetraethylene-pentamine (TEPA), pentaethylenehexamine (PEHA), and combinations thereof.

Any suitable alkylene oxide or combination of alkylene oxides can be used to cap the polyamine. In some embodiments, the alkylene oxide is selected from the group consisting of ethylene oxide, propylene oxide, butylene oxide, and combinations thereof. Alkylene oxide-capped polyamines are known in the art, and include, for example, propylene oxide-capped ethylene diamine sold under the trade name CARPOL® EDAP-770 (Carpenter Co., Richmond, Va.) and ethylene and propylene oxide-capped ethylene diamine sold under the trade name CARPOL® EDAP-800 (Carpenter Co., Richmond, Va.).

The additional isocyanate-reactive monomer (when used) can be present in varying amounts relative the one or more polyol used to form the polyurethane. In some embodiments, the additional isocyanate-reactive monomer can be present in an amount of 30% or less, 25% or less, 20% or less, 15% or less, 10% or less, or 5% or less by weight based on the weight of the one or more polyol.

As indicated herein, in the polyurethane composites, an isocyanate is reacted with a polyol (and any additional isocyanate-reactive monomers) to produce the polyurethane formulation. In general, the ratio of isocyanate groups to the total isocyanate reactive groups, such as hydroxyl groups, water and amine groups, is in the range of about 0.5:1 to about 1.5:1, which when multiplied by 100 produces an isocyanate index between 50 and 150. Additionally, the isocyanate index can be from about 80 to about 120, from about 90 to about 120, from about 100 to about 115, or from about 105 to about 110. As used herein, an isocyanate may be selected to provide a reduced isocyanate index, which can be reduced without compromising the chemical or mechanical properties of the composite material.

One or more catalysts can be added to facilitate curing and can be used to control the curing time of the polymer matrix. Examples of useful catalysts include amine-containing catalysts (such as DABCO, tetramethylbutanediamine, and diethanolamine) and tin-, mercury-, and bismuth-containing catalysts. In some embodiments, 0.01 wt % to 2 wt % catalyst or catalyst system (e.g., 0.025 wt % to 1 wt %, 0.05 wt % to 0.5 wt %, or 0.1 wt % to about 0.25 wt %) can be used based on the weight of the polyurethane composite.

The polyurethane can be present in the composite in amounts from 10% to 60% based on the weight of polyurethane composite. For example, the polyurethane can be included in an amount from 14% to 60% or 20% to 50% by weight, based on the weight of the polyurethane composite. In some embodiments, the polyurethane in the polyurethane composites can be present in an amount of 10% or greater, 15% or greater, 20% or greater, 25% or greater, 30% or greater, 35% or greater, 40% or greater, 45% or greater, 50% or greater, or 55% or greater by weight, based on the weight of polyurethane composite. In some embodiments, the polyurethane in the polyurethane composites can be present in an amount of 60% or less, 55% or less, 50% or less, 45% or less, 40% or less, 35% or less, 30% or less, 25% or less, 20% or less, or 15% or less by weight, based on the weight of polymeric composite.

The polyurethane composites can include an inorganic filler. Suitable examples of inorganic fillers can be an ash, ground/recycled glass (e.g., window or bottle glass); milled glass; glass spheres; glass flakes; activated carbon; calcium carbonate; aluminum trihydrate (ATH); silica; sand; ground sand; silica fume; slate dust; crusher fines; red mud; amorphous carbon (e.g., carbon black); clays (e.g., kaolin); mica; talc; wollastonite; alumina; feldspar; bentonite; quartz; garnet; saponite; beidellite; granite; calcium oxide; calcium hydroxide; antimony trioxide; barium sulfate; magnesium oxide; titanium dioxide; zinc carbonate; zinc oxide; nepheline syenite; perlite; diatomite; pyrophillite; flue gas desulfurization (FGD) material; soda ash; trona; and mixtures thereof. In some embodiments, the inorganic filler includes an ash. The ash can be a coal ash or another type of ash such as those produced by firing fuels including industrial gases, petroleum coke, petroleum products, municipal solid waste, paper sludge, wood, sawdust, refuse derived fuels, switchgrass or other biomass material. The coal ash can be fly ash, bottom ash, or combinations thereof. In some examples, the inorganic filler includes fly ash. Fly ash is produced from the combustion of pulverized coal in electrical power generating plants. The fly ash useful with the composite materials described herein can be Class C fly ash, Class F fly ash, or a mixture thereof. Fly ash produced by coal-fueled power plants is suitable for incorporation in the composites described herein. In some embodiments, the inorganic filler consists of or consists essentially of fly ash.

The inorganic filler can be present in the polyurethane composites described herein in amounts from 20% to 90% by weight. In some embodiments, the inorganic filler, for example fly ash, can be present in amounts from 35% to 80% such as from 50% to 80% or from 50% to 75% by weight. Examples of the amount of inorganic filler present in the composites described herein include 20%, 25%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, or 90% by weight.

In some embodiments, the inorganic filler can include sand. In certain embodiments, the inorganic filler can include fly ash and sand. The amount of sand in the composites can be from 0.1% to 15% by weight, based on the weight of the composite. In some embodiments, the composites can include 15% or less, 14% or less, 12% or less, 10% or less, or 8% or less by weight sand. In some embodiments, the composites can include 0.1% or greater, 0.5% or greater, 1% or greater, 2% or greater, 3% or greater, or 5% or greater by weight sand. In some embodiments, the composites can include 1% to 15%, 1% to 10%, or 1% to 8% by weight sand. In some embodiments, the sand is blast sand.

In some embodiments, the inorganic filler can include calcium carbonate. In certain embodiments, the inorganic filler can include fly ash and calcium carbonate. In certain embodiments, the inorganic filler can include fly ash, sand, and calcium carbonate. The amount of calcium carbonate in the composites can be from 0.1% to 15% by weight, based on the weight of the composite. In some embodiments, the composites can include 15% or less, 14% or less, 12% or less, 10% or less, or 8% or less by weight calcium carbonate. In some embodiments, the composites can include 0.1% or greater, 0.5% or greater, 1% or greater, 2% or greater, 3% or greater, or 5% or greater by weight calcium carbonate. In some embodiments, the composites can include 1% to 15%, 1% to 10%, or 1% to 8% by weight calcium carbonate. In some embodiments, the calcium carbonate can be limestone.

The polyurethane composites can include an organic fiber. The organic fiber can be any natural or synthetic fiber, based on organic materials. The organic fiber may improve the processability and mechanical strength of the polyurethane composites. The organic fiber can be present in the form of individual fibers, bundles, strings such as yarns, fabrics, papers, rovings, mats, or tows.

Suitable examples of organic fibers that can be used in the composite can include polyalkylene fibers, polyester fibers, polyamide fibers, phenol-formaldehyde fibers, polyvinyl chloride fibers, polyacrylic fibers, acrylic polyester fibers, polyurethane fibers, polyacrylonitrile fibers, rayon fibers, cellulose fibers, or combinations thereof. In certain embodiments, the organic fiber can include hemp fibers, sisal fibers, cotton fibers, straw, reeds, or other grasses, jute, bagasse fibers, bamboo fibers, abaca fibers, flax, southern pine fibers, wood fibers, cellulose, saw dust, wood shavings, lint, vicose, leather fibers, rayon, and mixtures thereof. Other suitable organic fiber includes synthetic fibers such as, Kevlar, viscose fibers, Dralon® fibers, polyethylene fibers, polyethylene terephthalate fibers, polyethylene naphthalate fibers, polypropylene fibers, polyvinyl alcohol fibers, aramid fibers, or combinations thereof. In some examples, the organic fiber can include polyester fibers. In some examples, the organic fiber can be obtained from a waste material such as from used carpets or other consumer sources.

The organic fiber in the polyurethane composites can have an average length of 50 mm or less. For example, the organic fiber can have an average length of 50 µm or greater, 60 µm or greater, 70 µm or greater, 80 µm or greater, 90 µm or greater, 100 µm or greater, 110 µm or greater, 120 µm or greater, 200 µm or greater, 300 µm or greater, 500 µm or greater, 750 µm or greater, 1 mm or greater, 2 mm or greater, 3 mm or greater, 5 mm or greater, 7.5 mm or greater, 10 mm or greater, 15 mm or greater, 20 mm or greater, 25 mm or greater, 30 mm or greater, 35 mm or greater, 40 mm or greater, or 45 mm or greater. In some embodiments, the organic fiber can have an average length of 45 mm or less, 40 mm or less, 35 mm or less, 30 mm or less, 26 mm or less, 20 mm or less, 15 mm or less, 10 mm or less, 7.5 mm or less, 6 mm or less, 5 mm or less, 3 mm or less, 2 mm or less, 1.5 mm or less, 1 mm or less, 900 µm or less, 800 µm or less, 700 µm or less, 600 µm or less, 500 µm or less, 400 µm or less, 300 µm or less, 250 µm or less, 200 µm or less, 150 µm or less, 140 µm or less, 130 µm or less, 120 µm or less, 110 µm or less, 100 µm or less, 90 µm or less, 80 µm or less, 70 µm or less, 60 µm or less, or 50 µm or less. In certain embodiments, the organic fiber in the polyurethane composites can have an average length of from 50 µm to 50 mm, 50 µm to 26 mm, 50 µm to 15 mm, 100 µm to 10 mm, 500 µm to 7.5 mm, 1 mm to 7 mm, or 3 mm to 6 mm. In some examples, the organic fiber can have an average length of 26 mm or less. In some examples, the organic fiber can have an average length of 100 µm or greater. In some embodiments, the lengths of the organic fiber in the composite can be uniform (i.e., the lengths of all the fibers can be within 10% of the average length). In some embodiments, the lengths of the organic fiber in the composite can vary. For example, the fiber lengths can fall into two modes having an average length within the disclosed range.

The organic fiber in the polyurethane composites can have an average diameter of 100 microns or less. In some embodiments, the organic fiber can have an average diameter of 95 microns or less, 90 microns or less, 85 microns or less, 80 microns or less, 75 microns or less, 70 microns or less, 65 microns or less, 50 microns or less, 45 microns or less, 40 microns or less, 30 microns or less, or 25 microns or less. In some embodiments, the organic fiber can have an average diameter of 1 micron or more, 2 microns or more, 3 microns or more, 5 microns or more, 10 microns or more, 15 microns or more, 20 microns or more, 25 microns or more, 30 microns or more, 35 microns or more, 40 microns or more, or 45 microns or more. In some embodiments, the organic fiber can have an average diameter of from 1 micron to 100 microns, 3 microns to 100 microns, 3 microns to 90 microns, 3 microns to 85 microns, 3 microns to 80 microns, 3 microns to 75 microns, 3 microns to 50 microns, 5 microns to 100 microns, or 10 microns to 100 microns.

The organic fiber can also be described by its aspect ratio. In some embodiments, the organic fiber in the polyurethane composites can have an average aspect ratio of length to diameter of from 1.5:1 to 4000:1. For example, the organic fiber can have an average aspect ratio of from 1.5:1 to 2000:1, 1.5:1 to 1000:1, 1.5:1 to 750:1, 1.5:1 to 500:1, 1.5:1 to 400:1, 1.5:1 to 300:1, 1.5:1 to 250:1, 2:1 to 200:1, 2.5:1 to 150:1, 3:1 to 100:1, 3.5:1 to 75:1, 4:1 to 50:1, 5:1 to 25:1, 5:1 to 20:1, or 5:1 to 10:1. In some embodiments, the organic fiber can have an average aspect ratio of length to diameter of from 1.5:1 or greater, 2:1 or greater, 3:1 or greater, 4:1 or greater, 5:1 or greater, 7.5:1 or greater, 10:1 or greater, 15:1 or greater, 20:1 or greater, 25:1 or greater, 30:1 or greater, or 40:1 or greater. In some embodiments, the organic fiber can have an average aspect ratio of length to diameter of from 200:1 or less, 150:1 or less, 100:1 or less, 75:1 or less, 50:1 or less, 40:1 or less. 30:1 or less, 20:1 or less, 10:1 or less, or 5:1 or less.

The organic fiber can be present in the polyurethane composites in any suitable amount to confer a desirable property to the composite. In some embodiments, the organic fiber can be present in the polyurethane composites in amounts of 0.1% or greater, 0.5% or greater, 1% or greater, 1.25% or greater, 1.5% or greater, 2% or greater, 3% or greater, 4% or greater, or 5% or greater by weight, based on the total weight of the composite. In some embodiments, the organic fiber can be present in the polyurethane composites in amounts of 20% or less, 15% or less, 10% or less, 8% or less, 7.5% or less, 7% or less, 6% or less, or 5% or less by weight, based on the total weight of the composite. In some embodiments, the organic fiber can be present in the polymeric composites in amounts from 0.1% to 25% by weight, based on the total weight of the composite. For example, the organic fiber can be in amounts from 0.1% to 20%, 0.5% to 15%, 0.5% to 10%, 0.5% to 8%, or 0.25% to 4% by weight, based on the total weight of the composite. In some embodiments, the organic fiber is present in the polyurethane composites in an effective amount to increase the flexural strength and/or handleability of a composite having a density of 45 lb/ft$^3$ or less, compared to a composite without the organic fiber.

The polyurethane composites can include an inorganic fiber. The inorganic fiber can be any natural or synthetic fiber, based on inorganic materials. Inorganic fibers suitable for use with the polyurethane composites can include glass fibers, basalt fibers, alumina silica fibers, aluminum oxide fibers, silica fibers, carbon fibers, metal fibers, mineral wool fibers such as stone wool, slag wool, or ceramic fiber wool, or combinations thereof. In some embodiments, the polyurethane composites can include a combination of inorganic fibers that break and fibers that do not break when the composite is being formed using processing machinery and/or fractured by external stress.

In some embodiments, the inorganic fiber in the polyurethane composites can include a plurality of glass fibers. Glass fibers can include fibrous glass such as E-glass, C-glass, S-glass, and AR-glass fibers. In some examples, fire resistant or retardant glass fibers can be included to impart fire resistance or retarding properties to the polyurethane composites. In some embodiments, the average length of the glass fibers in the polyurethane composites can be 1 mm or greater, 1.5 mm or greater, 2 mm or greater, 3 mm or greater, 4 mm or greater, 5 mm or greater, or 6 mm or greater. In some embodiments, the average length of the glass fibers can be 50 mm or less, 40 mm or less, 30 mm or less, 20 mm or less, 15 mm or less, 12 mm or less, or 10 mm or less. In some examples, the glass fibers can be from 1 mm to 50 mm in average length. For example, the glass fibers can be from 1.5 mm to 30 mm, from 2 mm to 30 mm, from 3 mm to 30 mm, or from 3 mm to 15 mm in average length. The glass fibers in the polyurethane composites can have any dimension of from 1 µm to 30 µm in average diameter. For example, the average diameter of the glass fibers can be 1.5 µm to 30 µm, 3 µm to 20 µm, 4 µm to 18 µm, or 5 µm to 15 µm in average diameter. The glass fibers can be provided in provided in the polyurethane composite in a random orientation or can be axially oriented.

The inorganic fiber (when used) can be present in the polyurethane composites in amounts from 0.25% to 20% by weight, based on the weight of polyurethane composite. For example, the inorganic fiber can be present in amounts from 0.5% to 20%, 0.5% to 15%, 1% to 20%, 2% to 20%, 0.5% to 10%, 1% to 10%, 2% to 10%, 1.5% to 8%, 2% to 6%, or 2% to 4% by weight, based on the weight of the polyurethane composite.

The weight ratio of the inorganic fiber to the organic fiber can be 1:1 or greater. In some embodiments, the weight ratio of the inorganic fiber to the organic fiber can be 1:1 or greater, 2:1 or greater, 3:1 or greater, 4:1 or greater, 5:1 or greater, 6:1 or greater, 7:1 or greater, 8:1 or greater, 9:1 or greater, 10:1 or greater, or 15:1 or greater. In some embodiments, the weight ratio of the inorganic fiber to the organic fiber can be 20:1 or less, 18:1 or less, 15:1 or less, 12:1 or less, 10:1 or less, 9:1 or less, 8:1 or less, 7:1 or less, 6:1 or less, or 5:1 or less. For example, the weight ratio of the inorganic fiber to the organic fiber can be from 1:1 to 20:1, 1:1 to 15:1, 1:1 to 10:1, 1:1 to 9:1, 1:1 to 8:1, 1:1 to 7:1, 1.5:1 to 6:1, or 2:1 to 5:1.

In some embodiments, the organic fiber, inorganic fiber, and/or inorganic filler such as fly ash can be coated with a composition to modify their reactivity. For example, the organic fiber, inorganic fiber, and/or inorganic filler can be coated with a sizing agent such as a coupling agent (compatibilizer). In some embodiments, the organic fiber, inorganic fiber, and/or the fly ash can be coated with a composition for promoting adhesion. U.S. Pat. No. 5,064,876 to Hamada et al. and U.S. Pat. No. 5,082,738 to Swofford, for example, disclose compositions for promoting adhesion. U.S. Pat. No. 4,062,999 to Kondo et al. and U.S. Pat. No. 6,602,379 to Li et al. describe suitable aminosilane compounds for coating fibers. In some embodiments, the organic fiber, inorganic fiber, and/or inorganic filler are surface coated with a composition comprising a silane compound such as aminosilane. In some embodiments, the organic fiber, inorganic fiber, and/or inorganic filler are surface coated with a composition comprising an oil, starch, or a combination thereof. In some embodiments, the polyurethane composites can include a combination of coated and uncoated fibers and/or inorganic filler.

The polyurethane composites described herein can comprise additional materials. The additional materials can include an organic filler, such as a recycled polymeric material. Suitable examples include pulverized polymeric foam or recycled rubber material. Additional components useful with the polyurethane composites can include foaming agents, blowing agents, surfactants, chain-extenders, crosslinkers, coupling agents, UV stabilizers, fire retardants, antimicrobials, anti-oxidants, and pigments. For example, the organic fiber, inorganic fiber, and/or inorganic filler can be coated with a surfactant, bonding agent, pigment, or combinations thereof. Though the use of such components is well known to those of skill in the art, some of these additional additives are further described herein.

Chemical foaming agents include azodicarbonamides (e.g., Celogen manufactured by Lion Copolymer Geismar); and other materials that react at the reaction temperature to form gases such as carbon dioxide. Water is an exemplary foaming agent that reacts with isocyanate to yield carbon dioxide. The presence of water as an added component or in the filler also can result in the formation of polyurea bonds through the reaction of the water and isocyanate. In some embodiments, water may be present in the mixture used to produce the polyurethane composite in an amount of from greater than 0% to 5% by weight or less, based on the weight of the mixture. In some embodiments, water can be present in a range of 0.02% to 4%, 0.05% to 3%, 0.1% to 2%, or 0.2% to 1% by weight, based on the weight of the mixture. In some embodiments, the mixture used to produce the polyurethane composite includes less than 0.5% by weight water.

Surfactants can be used as wetting agents and to assist in mixing and dispersing the materials in a composite. Surfactants can also stabilize and control the size of bubbles formed during the foaming event and the resultant cell structure. Surfactants can be used, for example, in amounts below about 0.5 wt % based on the total weight of the mixture. Examples of surfactants useful with the polyurethanes described herein include anionic, non-ionic and cationic surfactants. For example, silicone surfactants such as Tegostab B-8870, DC-197 and DC-193 (Air Products; Allentown, Pa.) can be used.

Low molecular weight reactants such as chain-extenders and/or crosslinkers can be included in the composite described herein. These reactants help the polyurethane system to distribute and contain the organic fiber, inorganic fiber, and/or inorganic filler within the composite. Chain-extenders are difunctional molecules, such as diols or diamines, that can polymerize to lengthen the urethane polymer chains. Examples of chain-extenders include ethylene glycol; 1,4-butanediol; ethylene diamine, 4,4'-methylenebis(2-chloroaniline) (MBOCA); diethyltoluene diamine (DETDA); and aromatic diamines such as Unilink 4200 (commercially available from UOP). Crosslinkers are tri- or greater functional molecules that can integrate into a polymer chain through two functionalities and provide one or more further functionalities (i.e., linkage sites) to cross-link to additional polymer chains. Examples of crosslinkers include glycerin, trimethylolpropane, sorbitol, diethanolamine, and triethanolamine. In some composites, a crosslinker or chain-extender may be used to replace at least a portion of the one or more polyol in the composite material. For example, the polyurethane can be formed by the reaction of an isocyanate, a polyol, and a crosslinker.

Coupling agents and other surface treatments such as viscosity reducers, flow control agents, or dispersing agents can be added directly to the filler or fiber, or incorporated prior to, during, and/or after the mixing and reaction of the composite material. Coupling agents can allow higher filler loadings of the inorganic filler such as fly ash, organic fiber, and/or inorganic fiber, and may be used in small quantities. For example, the composite material may comprise about 0.01 wt % to about 0.5 wt % of a coupling agent. Examples of coupling agents useful with the composite materials described herein include Ken-React LICA 38 and KEN-React KR 55 (Kenrich Petrochemicals; Bayonne, N.J.). Examples of dispersing agents useful with the composite materials described herein include JEFFSPERSE X3202, JEFFSPERSE X3202RF, and JEFFSPERSE X3204 (Huntsman Polyurethanes; Geismar, La.).

Ultraviolet light stabilizers, such as UV absorbers, can be added to the composite materials described herein. Examples of UV light stabilizers include hindered amine type stabilizers and opaque pigments like carbon black powder. Fire retardants can be included to increase the flame or fire resistance of the composite material. Antimicrobials can be used to limit the growth of mildew and other organisms on the surface of the composite. Antioxidants, such as phenolic antioxidants, can also be added. Antioxidants provide increased UV protection, as well as thermal oxidation protection.

Pigments or dyes can optionally be added to the composite materials described herein. An example of a pigment is iron oxide, which can be added in amounts ranging from about 2 wt % to about 7 wt %, based on the total weight of the composite material.

Methods of preparing the polyurethane composites are described herein. The polyurethane composites can be formed by the reaction of one or more isocyanate, selected from the group consisting of diisocyanates, polyisocyanates, and mixtures thereof, and one or more polyol, in the presence of an organic fiber and an inorganic filler. An inorganic fiber and/or a catalyst can also be present in the reaction mixture. In some embodiments, the polyurethane composite can be produced by mixing the one or more isocyanates, the one or more polyols, the organic fiber, and the inorganic filler, in a mixing apparatus such as a high speed mixer or an extruder. In some embodiments, mixing can be conducted in an extruder. The materials can be added in any suitable order. For example, in some embodiments, the mixing stage of the method used to prepare the polyurethane composite can include: (1) mixing the polyol, the organic fiber, and inorganic filler; (2) mixing the isocyanate with the polyol, the organic fiber, and inorganic filler; and optionally (3) mixing the catalyst with the isocyanate, the polyol, the organic fiber, and the inorganic filler. The inorganic fiber can be added at the same time as the organic fiber and inorganic filler, or can be added prior to, during, or after stage (2) or (3).

The polyurethane composite mixture can be blended in any suitable manner to obtain a homogeneous or heterogeneous blend of the one or more isocyanate, one or more polyol, inorganic filler, organic fiber, inorganic fiber, and catalyst. An ultrasonic device can be used for enhanced mixing and/or wetting of the various components of the composite. The ultrasonic device produces an ultrasound of a certain frequency that can be varied during the mixing and/or extrusion process. The ultrasonic device useful in the preparation of composite materials described herein can be attached to or adjacent to an extruder and/or mixer. For example, the ultrasonic device can be attached to a die or nozzle or to the port of an extruder or mixer. An ultrasonic device may provide de-aeration of undesired gas bubbles and better mixing for the other components, such as blowing agents, surfactants, and catalysts.

The mixture can then be extruded into a mold cavity of a mold, the mold cavity formed by at least an interior mold surface. The mold can be a continuous forming system such as a belt molding system or can include individual batch molds. The belt molding system can include a mold cavity formed at least in part by opposing surfaces of two opposed belts. A molded article can then be formed followed by removal of the article from the mold.

Incorporation of the organic fiber into the filled polyurethane mixture comprising an inorganic fiber (that is, the polyol, isocyanate, organic fiber, inorganic fiber, and inorganic filler) can decrease the viscosity of the mixture, and thus improve the processability of such materials and products. In some embodiments, it is desirable that the composite mixture has a viscosity below a particular threshold at the desired loadings so it can be effectively processed. In some embodiments, the organic fiber can be present in the composite mixture in amounts to produce a workable viscosity (initial viscosity) of from 25 Pa·s to 250 Pa·s. For example, the organic fiber in the composite mixture can be in amounts to produce a workable viscosity from 30 Pa·s to 250 Pa·s, 65 Pa·s to 250 Pa·s, or 80 Pa·s to 250 Pa·s. In some embodiments, the working viscosity can be more than 25 Pa·s, more than 30 Pa·s, more than 35 Pa·s, more than 40 Pa·s, more than 50 Pa·s, more than 60 Pa·s, more than 65 Pa·s, more than 70 Pa·s, or more than 80 Pa·s. In some embodiments, the working viscosity can be less than 250 Pa·s, less than 225 Pa·s, less than 200 Pa·s, less than 175 Pa·s, less than 150 Pa·s, less than 140 Pa·s, less than 130 Pa·s, less than 120 Pa·s, or less than 110 Pa·s. The mixture may be processed at an elevated temperature (e.g., 200-500° F.) to form a melt and to allow the mixture to have a workable viscosity. In some embodiments, the organic fiber, inorganic fiber, and/or inorganic filler are heated before mixing with the polyurethane. The viscosity of the composite mixture can be measured using a Thermo Electron Corporation Haake Viscometer.

In some embodiments, the composite mixture described herein can be foamed. The polyol and the isocyanate can be allowed to produce a foamed composite material after mixing the components according to the methods described herein. The composite materials can be formed while they are actively foaming or after they have foamed. For example, the material can be placed under the pressure of a mold cavity prior to or during the foaming of the composite material.

In some embodiments, incorporation of the organic fiber into the filled polyurethane composites comprising an inorganic fiber or partial replacement of the inorganic fiber with an organic fiber can maintain similar or improved physical properties and mechanical performance such as flexural strength and handleability of such materials. Further, partial or full replacement of inorganic fibers by organic fibers can make the fiber system less susceptible to breaking and crushing during the production process of highly-filled polyurethane composites and thus increases the efficiency of fiber reinforcement.

In some embodiments, incorporation of the organic fiber in a polyurethane composite can increase the flexural strength of the composite, compared to a composite without the organic fiber. In some embodiments, the flexural strength of the polyurethane composites can be increased by at least 10%, for example, 15% or greater, 20% or greater, 25% or greater, 30% or greater, 35% or greater, 50% or greater, 75% or greater, or even 100% or greater, compared to a composite without organic fiber. The flexural strength of the polyurethane composites described herein can be 200 psi or greater (e.g., up to 1600 psi). For example, the flexural strength of the polyurethane composites can be 300 psi or greater, 500 psi or greater, 700 psi or greater, 900 psi or greater, 1000 psi or greater, 1100 psi or greater, 1200 psi or greater, 1300 psi or greater, 1400 psi or greater, 1500 psi or greater, or 1600 psi or greater. The flexural strength can be determined by the load required to fracture a rectangular prism loaded in the three point bend test as described in ASTM C1185-08 (2012).

The optimization of various properties, such as viscosity, flexural strength, handleability, and density of the composite allows their use in building materials and other structural applications. For example, the polyurethane composites can be formed into shaped articles and used in building materials include siding materials, roofing materials such as roof coatings and roof tiles, architectural moldings, sheets, decking materials, synthetic lumber, sound barrier/insulation, thermal barriers, insulation, carpet backing, fencing materials, marine lumber, flexible or rigid foams such as automotive foams (e.g., for dashboard, seats or roofing), component coatings, and other shaped articles. Examples of shaped articles made using composite materials described herein include roof tile shingles, trim boards, building panels, scaffolding, cast molded products, doors, door parts, moldings, sills, stone, masonry, brick products, posts, signs, guard rails, retaining walls, park benches, tables, slats, corner arches, columns, wall boards, ceiling tiles, ceiling boards, soffits, and railroad ties. The polyurethane composites described herein further can be used as reinforcement of composite structural members including building materials such as doors, windows, furniture, and cabinets and for well and concrete repair. The polyurethane composites described herein also can be used to fill gaps, particularly to increase the strength of solid surface articles and/or structural components. The polyurethane composites can be flexible, semi-rigid or rigid foams. In some embodiments, the flexible foam is reversibly deformable (i.e. resilient) and can include open cells. An 8"×1"×1" piece of a flexible foam can generally wrap around a 1" diameter mandrel at room temperature without rupture or fracture. Flexible foams also generally have a density of less than 5 lb/ft³ (e.g. 1 to 5 lb/ft³). In some embodiments, the rigid foam is irreversibly deformable and can be highly crosslinked and/or can include closed cells. Rigid foams generally have a density of 5 lb/ft³ or greater.

In some embodiments, the overall density of the polyurethane composites and/or the molded articles described herein can be 2 lb/ft³ or greater. For example, the overall density can be 5 lb/ft³ to 75 lb/ft³, 10 lb/ft³ to 70 lb/ft³, 15 lb/ft³ to 65 lb/ft³, 20 lb/ft³ to 60 lb/ft³, 25 lb/ft³ to 55 lb/ft³, or 10 lb/ft³ to 35 lb/ft³.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the disclosure. Unless indicated otherwise, parts and percentages are on a weight basis, temperature is in ° C. or is at ambient temperature, and pressure is at or near atmospheric.

Mechanical Properties of Highly-Filled Polyurethane Composites with Various Combinations of '3075' Glass Fiber and Different Organic Fibers.

Preparation of Filled Polyurethane Composite:

Polyurethane composites were prepared using four different polyester fibers with varying denier labeled PO3, PO6, PO45 or PG300. PO45 refers to ⅛" long 45 denier polyester fiber; PG300 refers to 3 denier ground polyester fiber from Flock Tex, R.I., USA; and PO3 and PO6 refer to 3 and 6 denier polyester fibers, respectively, obtained from Minifibers, Tenn., USA. The composites were prepared by mixing a polyol blend containing 6% by weight CARPOL MX-470 and 94% by weight TEROL 198 to produce a polyol mixture. The polyol mixture was then mixed with 1% by weight of an amine catalyst (diethanolamine), and 2% by weight of a silicone surfactant (Tegostab B-8870) in an extruder. Fly ash, glass fibers, and/or the polyester fibers, in the amounts specified in Table 1, were added and wetted with the liquid solution. Glass fibers refer to chopped strand glass fiber with glass filaments of 13 μm diameter and about ⅛" length, obtained from PPG Industries, Ohio, USA. Methylene diphenyl diisocyanate (MDI; 104 index; 51.5 g) was then added to the extruder, and simultaneously stirring began. The mixture was extruded into a belt molding system and allowed to cure. The physical properties of the composites, including flexural strength, handleability, extension, and modulus were determined. The handleability is a measure of the ability of the material to be flexed during use and is calculated as 0.5×breaking load×ultimate deflection/thickness of the test specimen. The extension is a measure of the elongation of a sample during the three point bend test as defined in ASTM C1185. The modulus is calculated as the stress/strain from the three point bend test. Normalized flexural strength is the ratio of flexural strength divided by the density. The density of the composites were controlled in this example.

TABLE 1

Mechanical properties of highly-filled polyurethane composites with various combinations of glass fiber and different organic fibers.

| Samples | Polyurethane, wt % | Fly ash, wt % | Fiber Glass, wt % | PO3, wt % | PO6, wt % | PO45, wt % | PG300, wt % | Density, pcf | Flexural Strength, psi | Normalized Flexural Strength, psi/pcf | Handleability, lbf-in/in | Extension, in | Modulus, ksi |
|---|---|---|---|---|---|---|---|---|---|---|---|---|---|
| Control | 23 | 73 | 4 | 0 | 0 | 0 | 0 | 45.7 | 1999 | 43.7 | 12.2 | 0.0583 | 190 |
| Control 2% Glass | 23 | 75 | 2 | 0 | 0 | 0 | 0 | 45.4 | 1732 | 38.1 | 7.4 | 0.0423 | 233 |
| 2% FG, 0.5% PO3 | 23 | 74.5 | 2 | 0.5 | 0 | 0 | 0 | 46.7 | 1952 | 41.8 | 10.5 | 0.0295 | 213 |
| 2% FG, 1% PO3 | 23 | 74 | 2 | 1 | 0 | 0 | 0 | 48.6 | 2112 | 43.4 | 11.1 | 0.0523 | 252 |
| 2% FG, 2% PO3 | 23 | 73 | 2 | 2 | 0 | 0 | 0 | 48.7 | 2105 | 43.2 | 12 | 0.0569 | 235 |
| 2% FG, 0.5% PO6 | 23 | 74.5 | 2 | 0 | 0.5 | 0 | 0 | 45.4 | 2172 | 47.9 | 12.2 | 0.0249 | 226 |
| 2% FG, 1% PO6 | 23 | 74 | 2 | 0 | 1 | 0 | 0 | 45.9 | 1920 | 41.8 | 10.9 | 0.0298 | 198 |
| 2% FG, 2% PO6 | 23 | 73 | 2 | 0 | 2 | 0 | 0 | 48.5 | 2036 | 42 | 12.6 | 0.0418 | 198 |
| 2% FG, 0.25% PO45 | 23 | 74.75 | 2 | 0 | 0 | 0.25 | 0 | 45.9 | 1949 | 42.4 | 9.8 | 0.0512 | 222 |

TABLE 1-continued

Mechanical properties of highly-filled polyurethane composites with various combinations of glass fiber and different organic fibers.

| Samples | Polyurethane, wt % | Fly ash, wt % | Fiber Glass, wt % | PO3, wt % | PO6, wt % | PO45, wt % | PG300, wt % | Density, pcf | Flexural Strength, psi | Normalized Flexural Strength, psi/pcf | Handleability, lbf-in/in | Extension, in | Modulus, ksi |
|---|---|---|---|---|---|---|---|---|---|---|---|---|---|
| 2% FG, 0.5% PO45 | 23 | 74.5 | 2 | 0 | 0 | 0.5 | 0 | 45.8 | 1953 | 42.6 | 9.9 | 0.0506 | 226 |
| 2% FG, 1% PO45 | 23 | 74 | 2 | 0 | 0 | 1 | 0 | 45.9 | 2116 | 46.1 | 11.2 | 0.0383 | 237 |
| 2% FG, 2% PO45 | 23 | 73 | 2 | 0 | 0 | 2 | 0 | 45.7 | 2062 | 45.1 | 11.1 | 0.0509 | 221 |
| 2% FG, 0.5% PG300 | 23 | 74.5 | 2 | 0 | 0 | 0 | 0.5 | 46.6 | 1968 | 42.2 | 9.8 | 0.05 | 226 |
| 2% FG, 1% PG300 | 23 | 74 | 2 | 0 | 0 | 0 | 1 | 50.2 | 2300 | 45.8 | 11.1 | 0.0489 | 272 |
| 2% FG, 2% PG300 | 23 | 73 | 2 | 0 | 0 | 0 | 2 | 50.3 | 2116 | 42.1 | 10.3 | 0.0487 | 255 |

Summary:

Table 1 shows that the glass fiber content needs to be raised from 2% to 4% in order to increase the flexural strength from 1732 psi to 2000 psi, doubling the cost of fibers in the composition. As a comparison, the use of 0.5% of the four different polyester fibers, PO3, PO6, PO45, and/or PG300 in addition to 2% glass fiber, all improve the flexural strength to around 2000 psi. Thus the polymer fiber was able to provide similar flexural properties at a 1:4 ratio compared to 4% inorganic fiber alone. In general, polymer fibers are 2 to 3 times the cost of inorganic glass fibers and thus a 1:4 ratio of polymer fiber to glass fiber is a cost saving over the use of glass fibers alone.

Further, the density of organic or polymer fibers is generally lower than the density of glass fibers so that at the same weight, the number of polymer fibers is larger than the number of glass fibers. In addition, polymer fibers are much less brittle than glass fiber and are thus much less likely to break during the manufacturing process especially during mixing of ingredients, leading to more efficient reinforcement. Therefore, a lower weight percent of polymer fibers can achieve the same reinforcing effect compared to glass fibers.

Mechanical Properties of Highly-Filled Polyurethane Composites with Various Combinations of Glass Fiber and Different Organic Fibers.

Preparation of Filled Polyurethane Composite:

Polyurethane composites were prepared using the polyester fibers PG300 and/or PO45. The composites were prepared as described above using fly ash, glass fibers, and/or the polyester fibers, in the amounts specified in Table 2. The density of the composites were controlled in this example. The physical properties of the composites, including flexural strength, handleability, extension, and modulus were determined.

TABLE 2

Mechanical properties of highly-filled polyurethane composites with various combinations of glass fiber and different organic polyester fibers.

| Properties | Polyurethane, wt % | Fly ash, wt % | Fiber Glass, ⅛" length, wt % | PG300, wt % | Density, pcf | Flexural Strength, psi | Normalized Flexural Strength, psi/pcf | Handleability, lbf-in/in | Extension, in | Modulus, ksi |
|---|---|---|---|---|---|---|---|---|---|---|
| GF 4% | 23 | 73 | 4 | 0 | 34.4 | 755 | 27.8 | 5.8 | 0.0543 | 50 |
| GF 10% | 23 | 67 | 10 | 0 | 32.6 | 924 | 25.4 | 6.5 | 0.0524 | 65 |
| GF 10% + PG300 0.25% | 23 | 66.75 | 10 | 0.25 | 34.4 | 1290 | 37.7 | 8.2 | 0.0474 | 102 |
| GF 10% + PG300 0.5% | 23 | 66.5 | 10 | 0.5 | 34.4 | 1324 | 38.6 | 8.4 | 0.0469 | 103 |
| GF 10% + PO45 0.25% | 23 | 66.75 | 10 | 0.25 | 33.4 | 1086 | 32.6 | 6.4 | 0.0445 | 90 |
| GF 10% + PO45 0.5% | 23 | 66.5 | 10 | 0.5 | 34.3 | 1408 | 41.1 | 9.5 | 0.0526 | 112 |
| GF 10% + PO45 1% | 23 | 66 | 10 | 1 | 32.1 | 1247 | 38.9 | 8.7 | 0.0541 | 92 |
| GF 10% + PO45 2% | 23 | 66 | 10 | 2 | 32.6 | 1393 | 42.8 | 12.5 | 0.0698 | 73 |

Summary:

As shown in Table 2, the flexural strength of highly-filled polyurethane composite with 10% glass fiber is about 924 psi at a density of 32.6 pcf (pounds per cubic foot). Raising the glass fiber content above 10% to improve the strength can be difficult because the mixture becomes very thick and viscous. The use of additional polymer fibers significantly increases the flexural strength without affecting the viscosity negatively. For example, the use of 0.5% extra PG300 and PO45 improves the flexural strength to 1324 psi at a density of 34.4 pcf and 1393 psi at a density of 32.6 pcf, respectively. The polymer fibers had the benefit of further improve the mechanical performance of the highly-filled polyurethane system when it is not practical to add any more inorganic fibers.

Also of significance is that PG300 is a ground polyester compared to PO45 which is a chopped polyester. The grinding of polyester to a fine fiber length of less than 100 micrometers is cost effective compare to chopping coarse 45 denier polyester fiber to ⅛" length.

Mechanical Properties of Highly-Filled Polyurethane Composites with Various Combinations of Glass Fiber, Blast Sand and PG300 Polyester Fiber.

Preparation of Filled Polyurethane Composite:

Polyurethane composites were prepared using the polyester fibers PG300 and/or blast sand. The composites were prepared as described above using fly ash, glass fibers, blast sand, and/or the polyester fiber, in the amounts specified in Tables 3 and 4. The physical properties of the composites, including flexural strength, handleability, extension, and modulus were determined.

Summary:

An additional benefit of using both inorganic and organic fibers is to effectively reduce both the glass fiber content and total fiber content. The glass fiber 10%+blast sand 20%" formulation exhibited satisfactory flexural strength, however, the starting mixture had a high viscosity not permitting easy mixing workability of the mixture. The use of 1 wt % PG300 polyester fiber mitigates the problem by providing similar properties in the final product with reduced fiber glass content of from 10% to 7% and total fiber content of 10% to 8% (Table 3). Similarly, as can be seen in Table 4, the formulation with a combination of 8% glass fiber and 0.5% PG300 is found to have the same flexural strength as a formulation with 10% glass fiber only. Thus, the combination of polyester fiber and glass fiber permits better workability of the starting mixture and improved mechanical properties of the final product. Tables 3 and 4 also show the use of siliceous inorganic particulate sand, blast sand, as filler is capable of improving strength.

The compositions and methods of the appended claims are not limited in scope by the specific compositions and methods described herein, which are intended as illustrations of a few aspects of the claims and any compositions

TABLE 3

Mechanical properties of highly-filled polyurethane composites with various combinations of glass fiber, blast sand and PG300 polyester fiber.

| Properties | Polyurethane, in parts | Fly ash, parts | Blast Sand, parts | Fiber Glass 3075-⅛", parts | PG300, parts | Density, pcf | Flexural Strength, psi | Normalized Flexural Strength, psi/pcf | Handleability, lbf-in/in | Extension, in | Modulus, ksi |
|---|---|---|---|---|---|---|---|---|---|---|---|
| GF 10% + BS 20% | 23 | 67 | 13.4 | 10 | 0 | 41 | 1421 | 34.6 | 9.3 | 0.0474 | 111 |
| GF 8% + PG300 0.25% + BS 20% | 23 | 68.75 | 13.75 | 8 | 0.25 | 37.8 | 1272 | 33.7 | 7.7 | 0.0456 | 103 |
| GF 8% + PG300 0.5% + BS 20% | 23 | 68.5 | 13.7 | 8 | 0.5 | 36.4 | 1374 | 37.7 | 9.9 | 0.0549 | 96 |
| GF 7% + PG300 0.25% + BS 20% | 23 | 69.75 | 13.95 | 7 | 0.25 | 36.6 | 1080 | 29.5 | 7.7 | 0.0548 | 80 |
| GF 7% + PG300 0.5% + BS 20% | 23 | 69.5 | 13.9 | 7 | 0.5 | 37.5 | 1337 | 35.7 | 9.1 | 0.0516 | 103 |
| GF 7% + PG300 1% + BS 20% | 23 | 69 | 13.8 | 7 | 1 | 39.4 | 1403 | 35.6 | 9.2 | 0.0492 | 111 |
| GF 6% + PG300 0.25% + BS 20% | 23 | 70.75 | 14.15 | 6 | 0.25 | 35.7 | 1040 | 29.2 | 7.4 | 0.0554 | 71 |
| GF 6% + PG300 0.5% + BS 20% | 23 | 70.5 | 14.1 | 6 | 0.5 | 35.9 | 1048 | 29.2 | 7.7 | 0.0563 | 69 |
| GF 6% + PG300 1% + BS 20% | 23 | 70 | 14 | 6 | 1 | 37.2 | 1152 | 30.9 | 7.5 | 0.0496 | 92 |
| GF 6% + PG300 1.5% + BS 20% | 23 | 69.5 | 13.9 | 6 | 1.5 | 37.1 | 1055 | 28.4 | 6.8 | 0.0477 | 86 |

TABLE 4

Mechanical properties of highly-filled polyurethane composites with various combinations of glass fiber, blast sand and PG300 polyester fiber.

| Properties | Polyurethane, in parts | Fly ash, parts | Blast Sand, parts | Fiber Glass 3075-⅛", parts | PG300, parts | Density, pcf | Flexural Strength, psi | Normalized Flexural Strength, psi/pcf | Handleability, lbf-in/in | Extension, in | Modulus, ksi |
|---|---|---|---|---|---|---|---|---|---|---|---|
| GF 4% | 23 | 73 | 14.6 | 4 | 0 | 33 | 764 | 23.2 | 4.9 | 0.0462 | 65 |
| GF 10% + BS 20% | 23 | 67 | 13.4 | 10 | 0 | 40.6 | 1457 | 35.9 | 9.4 | 0.0457 | 117 |
| GF 8% + PG300 0.5% + BS 20% | 23 | 68.5 | 13.7 | 8 | 0.5 | 41.3 | 1476 | 35.7 | 9.6 | 0.0463 | 119 | and methods that are functionally equivalent are intended to fall within the scope of the claims. Various modifications of the compositions and methods in addition to those shown and described herein are intended to fall within the scope of the appended claims. Further, while only certain representative materials and method steps disclosed herein are specifically described, other combinations of the materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed. As used in this disclosure and in the appended claims, the singular forms "a", "an", "the", include plural referents unless the context clearly dictates otherwise.

What is claimed is:

1. A composite comprising:
   (a) from 14% to 60% by weight, based on the total weight of the composite, of a polyurethane formed by the reaction of (i) one or more isocyanates selected from the group consisting of diisocyanates, polyisocyanates, and mixtures thereof, and (ii) one or more polyols;
   (b) from 35% to 85% by weight, based on the total weight of the composite, of an inorganic filler;
   (c) from 0.25% to 20% by weight, based on the total weight of the composite, of an inorganic fiber; and
   (d) a polyester fiber,
   wherein the weight ratio of the inorganic fiber to polyester fiber is 1:1 to 20:1, and
   wherein the polyester fiber has an average length of from 50 microns to 26 mm.

2. The composite of claim 1, wherein the polyester fiber is present in an amount of 0.10% to 20% by weight, based on the total weight of the composite.

3. The composite of claim 1, wherein the polyester fiber is present in an amount of 0.50% to 8% by weight, based on the total weight of the composite.

4. The composite of claim 1, wherein the composite further comprises at least one organic fiber selected from the group consisting of polyalkylene fibers, polyamide fibers, phenol-formaldehyde fibers, polyvinyl chloride fibers, polyacrylic fibers, acrylic polyester fibers, polyurethane fibers, polyacrylonitrile fibers, rayon fibers, cellulose fibers, and combinations thereof.

5. The composite of claim 1, wherein the inorganic fiber is present in an amount of 0.50% to 10% by weight, based on the total weight of the composite.

6. The composite of claim 1, wherein the inorganic fiber comprises glass fibers, mineral wood fibers, or a combination thereof.

7. The composite of claim 1, wherein the inorganic filler comprises fly ash, silica, calcium carbonate, or a mixture thereof.

8. The composite of claim 1, wherein the inorganic filler is present in an amount of 50% to 80% by weight, based on the total weight of the composite.

9. The composite of claim 7, wherein the inorganic filler comprises fly ash.

10. The composite of claim 1, wherein the composite has a density of 10 lb/ft$^3$ to 70 lb/ft$^3$.

11. The composite of claim 1, wherein the composite is foamed.

12. The composite of claim 1, wherein the composite has a flexural strength of 200 psi or greater, as measured by ASTM C1185.

13. The composite of claim 1, wherein the composite has a flexural strength of 1000 psi or greater, as measured by ASTM C1185.

14. A building material comprising the composite of claim 1.

15. The building material of claim 14, wherein the building material is selected from siding materials, carpet backing, building panels, sheets, architectural moldings, sound barriers, thermal barriers, insulation, wall board, ceiling tiles, ceiling boards, soffit, and roofing materials.

16. A composite comprising:
    (a) a polyurethane;
    (b) an inorganic filler;
    (c) an inorganic fiber; and
    (d) a polyester fiber,
    wherein the weight ratio of the inorganic fiber to polyester fiber is 1:1 to 20:1, and
    wherein the polyester fiber has an average length of from 50 microns to 26 mm.

17. The composite of claim 16, wherein the inorganic fiber is present in an amount of 0.25% to 20% by weight, and the polyester fiber is present in an amount of 0.1% to 20% by weight, based on the total weight of the composite.

18. The composite of claim 16, wherein the inorganic filler is present in an amount of 35% to 85% by weight, based on the total weight of the composite.

19. A composite comprising:
    (a) 14% to 60% by weight, based on the total weight of the composite, of a polyurethane;
    (b) 35% to 85% by weight, based on the total weight of the composite, of an inorganic filler;
    (c) an inorganic fiber; and
    (d) a polyester fiber having an average length of from 50 microns to 26 mm;
    wherein the weight ratio of the inorganic fiber to polyester fiber is 1:1 to 20:1.

20. The composite of claim 19, wherein the inorganic fiber is present in an amount of 0.25% to 20% by weight, based on the total weight of the composite.

* * * * *